United States Patent [19]
Kikuchi

[11] Patent Number: 5,848,904
[45] Date of Patent: Dec. 15, 1998

[54] DEVICE FOR ELECTRICALLY CONNECTING EQUIPMENT AND CASE ACCOMMODATING THE EQUIPMENT

[75] Inventor: Hiroshi Kikuchi, Zushi, Japan

[73] Assignee: Canon Kabushiki Kaisha, Tokyo, Japan

[21] Appl. No.: 346,249

[22] Filed: Nov. 23, 1994

[30] Foreign Application Priority Data

Nov. 25, 1993 [JP] Japan .................................. 5-317540

[51] Int. Cl.[6] .................................................. H01R 13/44
[52] U.S. Cl. ........................................ 439/136; 439/911
[58] Field of Search ................................... 439/136–142, 439/259, 263, 481, 500; 429/97–100; 200/50.1, 50.12, 50.14, 50.19, 61.7; 320/2

[56] References Cited

U.S. PATENT DOCUMENTS

| | | | |
|---|---|---|---|
| 3,781,495 | 12/1973 | Splingaerd | 439/911 |
| 3,881,961 | 5/1975 | Nation | 439/500 |
| 4,494,854 | 1/1985 | Yamaga et al. | 429/163 |
| 4,539,516 | 9/1985 | Thompson | 429/100 |
| 4,592,608 | 6/1986 | Ohtsuka et al. | 439/140 |
| 4,648,013 | 3/1987 | Curiel | 429/100 |
| 4,772,214 | 9/1988 | Stoegmueller | 439/929 |
| 5,006,779 | 4/1991 | Fenne et al. | 320/2 |
| 5,030,902 | 7/1991 | Mattinger et al. | 439/929 |
| 5,059,885 | 10/1991 | Weiss et al. | 439/929 |
| 5,224,868 | 7/1993 | Tseng | 439/136 |
| 5,296,318 | 3/1994 | Gozdz et al. | 429/192 |
| 5,354,215 | 10/1994 | Viracola | 439/500 |
| 5,413,510 | 5/1995 | Taylor | 439/929 |
| 5,432,689 | 7/1995 | Sharrah et al. | 439/929 |

FOREIGN PATENT DOCUMENTS 59-3560  1/1984  Japan .

*Primary Examiner*—Neil Abrams
*Assistant Examiner*—Brian J. Biggi
*Attorney, Agent, or Firm*—Fitzpatrick, Cella, Harper & Scinto

[57] ABSTRACT

A device for connecting an equipment and a case accommodating the equipment, includes first means which operates in accordance with an operation for accommodating the equipment in the case, and second means for setting a state for allowing an electrical connection between the equipment and the case in accordance with the operation of the first means.

58 Claims, 10 Drawing Sheets

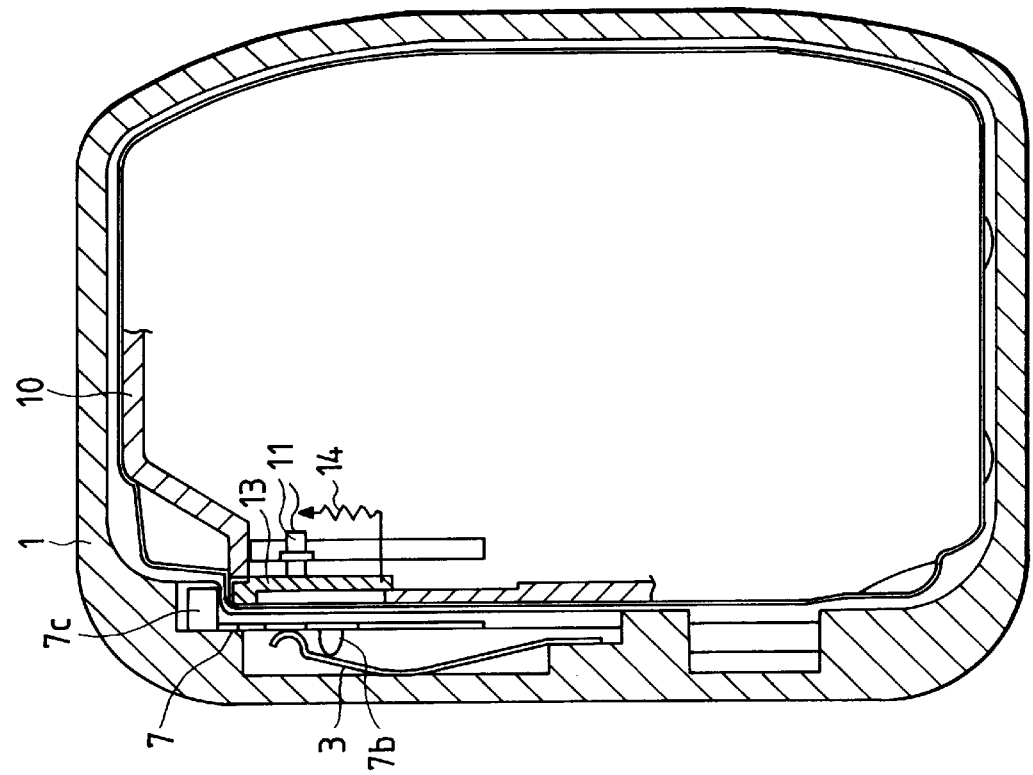
FIG. 4 (CASE COVER OPENING STATE)
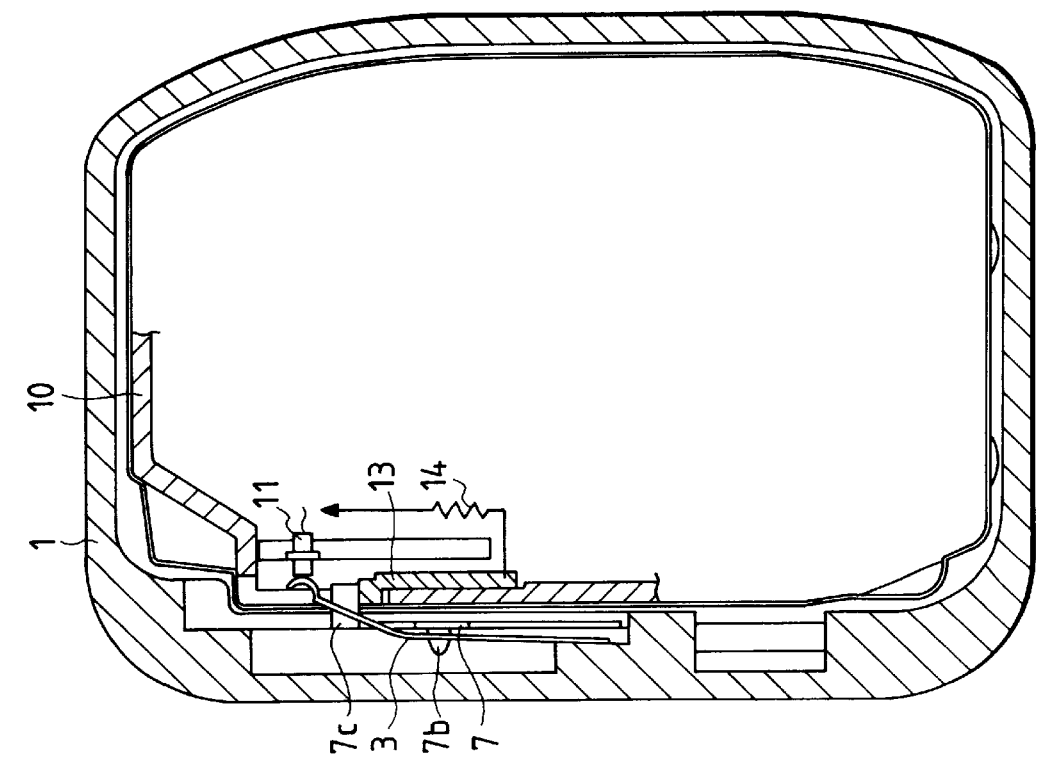
FIG. 3 (CASE COVER CLOSING STATE)

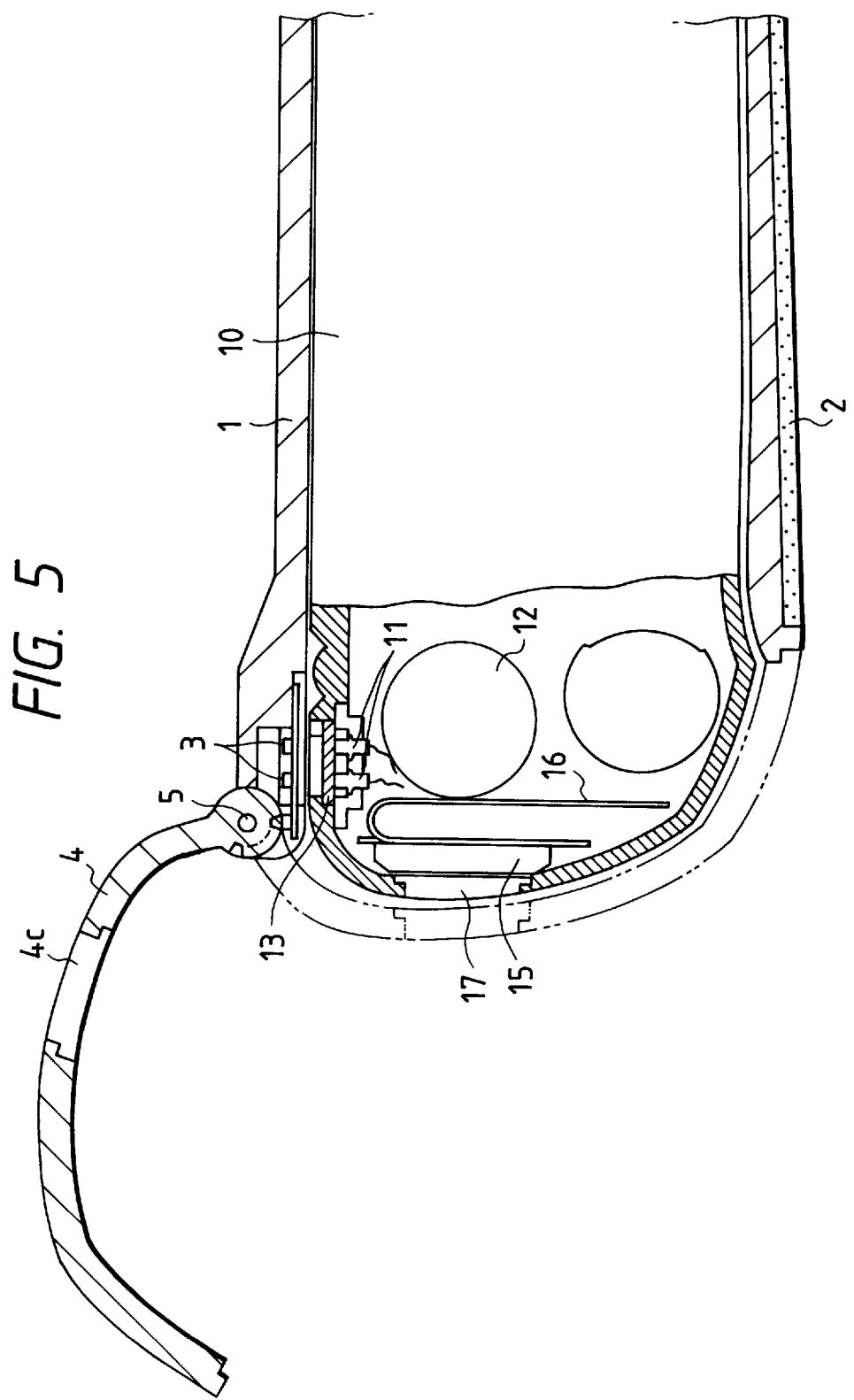

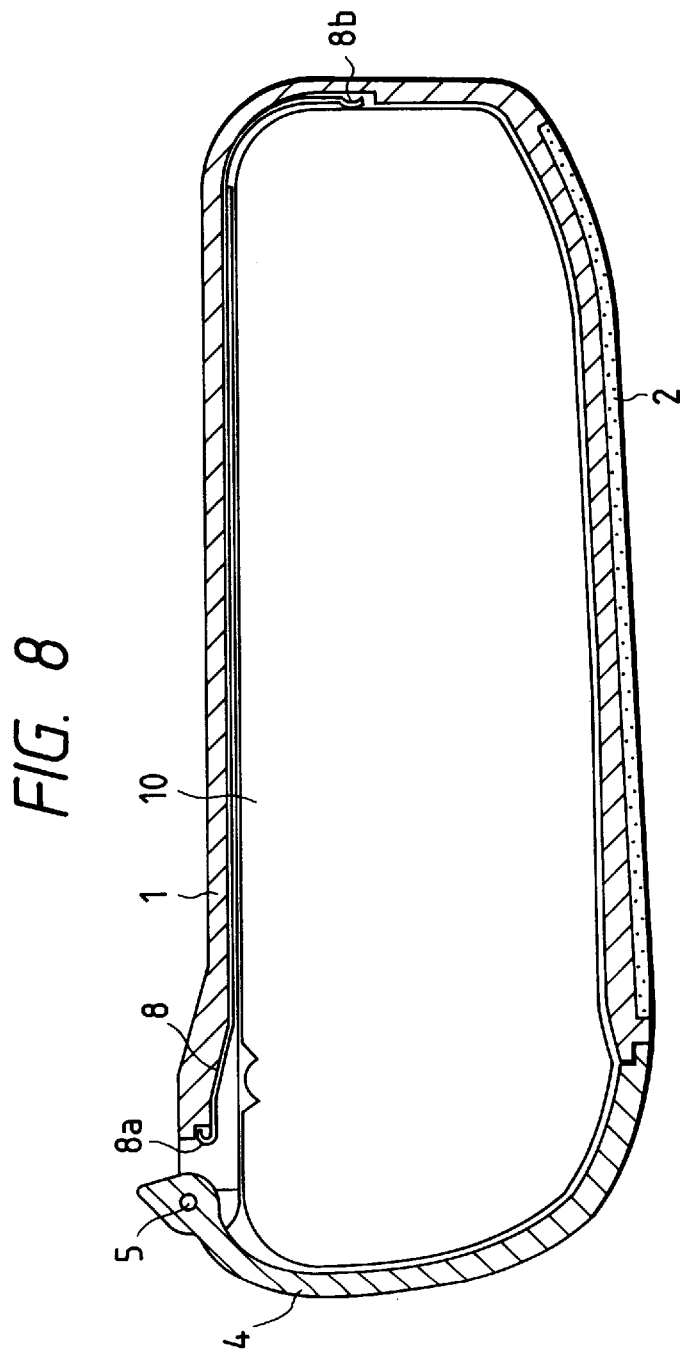

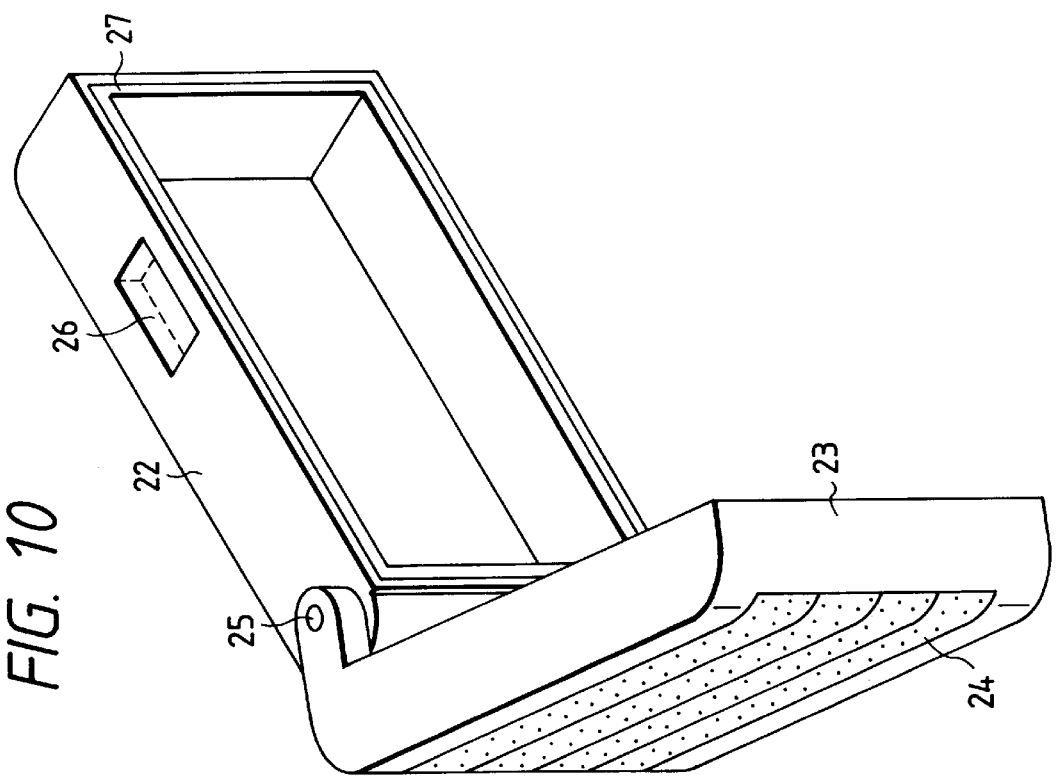
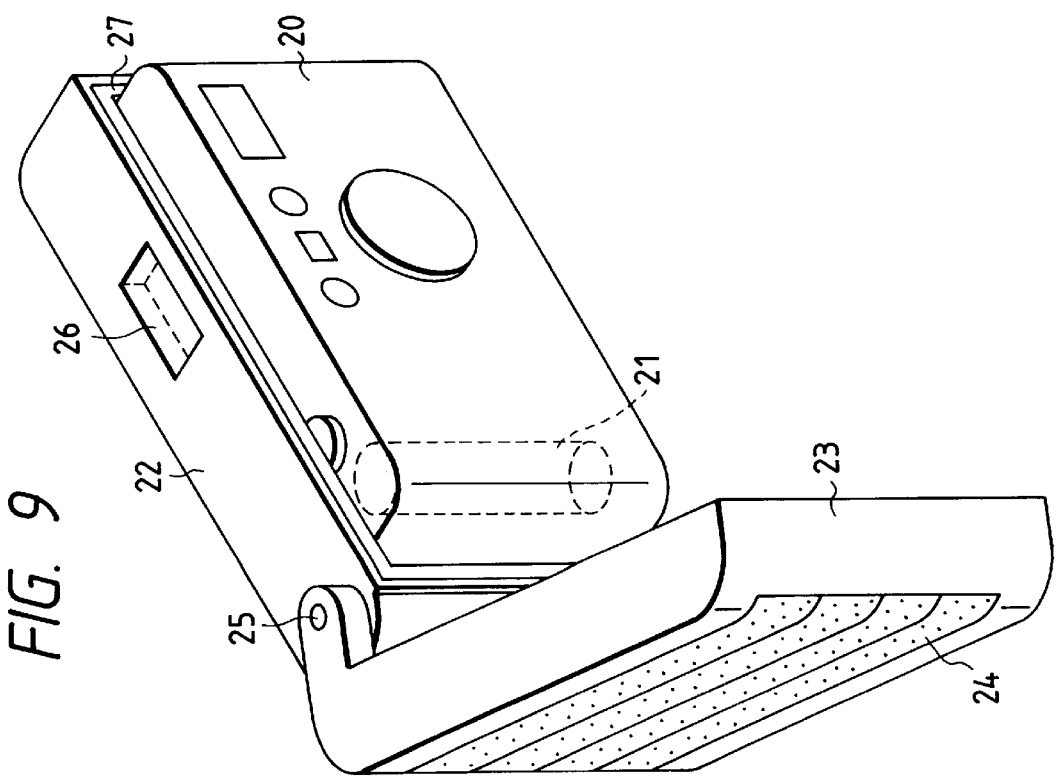

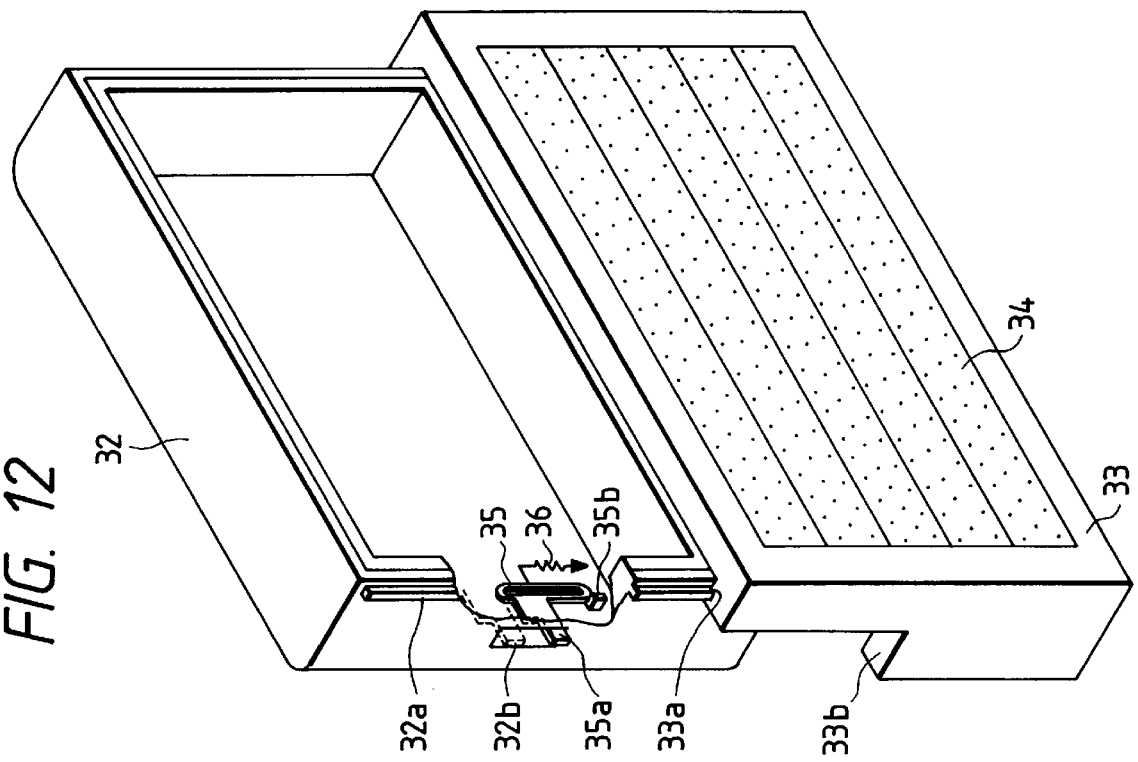
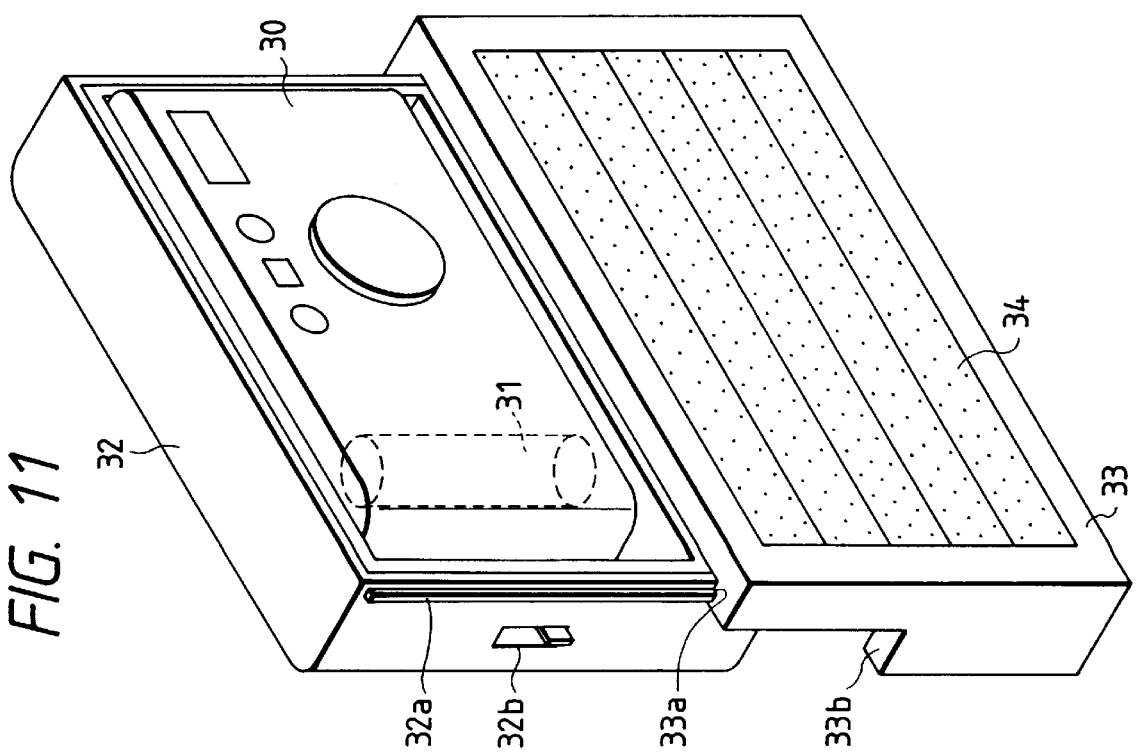

5,848,904

DEVICE FOR ELECTRICALLY CONNECTING EQUIPMENT AND CASE ACCOMMODATING THE EQUIPMENT

BACKGROUND OF THE INVENTION

1. Field of the Invention

The present invention relates to an improvement in a device for electrically connecting an equipment and a case accommodating the equipment.

2. Related Background Art

In a conventional device for electrically connecting a solar battery and a portable electronic equipment accommodated in an accommodating case having the solar battery arranged on its outer surface, as described in Japanese Laid-Open Utility Model Application No. 59-3560, the connection terminals of the equipment and the accommodating case are externally exposed when the equipment and the solar battery are not connected to each other.

However, with this structure, the terminal contact portions may be easy contaminated, thus causing a conduction failure. Furthermore, a user may erroneously short-circuit the terminals, resulting in a failure of the equipment.

The device has a structure which easily allows direct charging of a secondary battery in the equipment using another power supply such as a domestic power supply of 100 V in place of charging from the solar battery. For this reason, the secondary battery may be accidentally charged in this way, resulting in a failure of the equipment.

SUMMARY OF THE INVENTION

One aspect of the present invention is to provide a device for connecting an equipment and a case accommodating the equipment, an equipment adapted to be accommodated in a case, or a case adapted to accommodate an equipment, which comprises first means which operates in accordance with an operation for accommodating the equipment in the case, and second means for setting a state for allowing an electrical connection between the equipment and the case in accordance with the operation of the first means, which prevents a conduction failure or a connection error of a connection portion of the equipment or case.

Another aspect of the present invention is to provide a device for connecting an equipment and a case accommodating the equipment, an equipment adapted to be accommodated in a case, or a case adapted to accommodate an equipment, which comprises first means which operates in accordance with an operation for taking out the equipment from the case, and second means for setting the equipment and the case in a state for inhibiting an electrical connection between the equipment and the case in accordance with the operation of said first means, which prevents a conduction failure or a connection error of a connection portion of the equipment or case.

Other aspects of the present invention will become apparent from the following description of the preferred embodiments.

BRIEF DESCRIPTION OF THE DRAWINGS

FIG. 3 is a longitudinal sectional view showing a state before a camera-side terminal and a case-side contact are brought into contact with each other in a state wherein the camera is accommodated in the accommodating case with the solar battery shown in FIG. 1;

FIG. 4 is a longitudinal sectional view showing a state wherein the camera-side terminal and the case-side contact are in contact with each other in a state wherein the camera is accommodated in the accommodating case with the solar battery shown in FIG. 1;

FIG. 5 is a cross-sectional view showing a state before the camera-side terminal and the case-side contact are brought into contact with each other in a state wherein the camera is accommodated in the accommodating case with the solar battery shown in FIG. 1;

FIG. 8 is a cross-sectional view showing a state wherein the camera is accommodated in the accommodating case with the solar battery and a case cover is closed from the state shown in FIG. 7;

FIG. 9 is a perspective view showing a state wherein a camera as an electronic equipment is accommodated in an accommodating case according to the second embodiment of the present invention;

FIG. 10 is a perspective view showing a state before the camera is accommodated in the accommodating case shown in FIG. 9;

FIG. 11 is a perspective view showing an accommodating case and a camera as an electronic equipment according to the third embodiment of the present invention;

FIG. 12 is a perspective view showing a state before the camera is accommodated in the accommodating case shown in FIG. 11.

DETAILED DESCRIPTION OF THE PREFERRED EMBODIMENTS

The preferred embodiments of the present invention will be described in detail hereinafter with reference to the accompanying drawings.

FIGS. 1 to 8 show the first embodiment of the present invention, and the mechanical arrangement will be described first below with reference to FIGS. 1 to 5. In this embodiment, a camera is exemplified as an electronic equipment.

Figure 1:
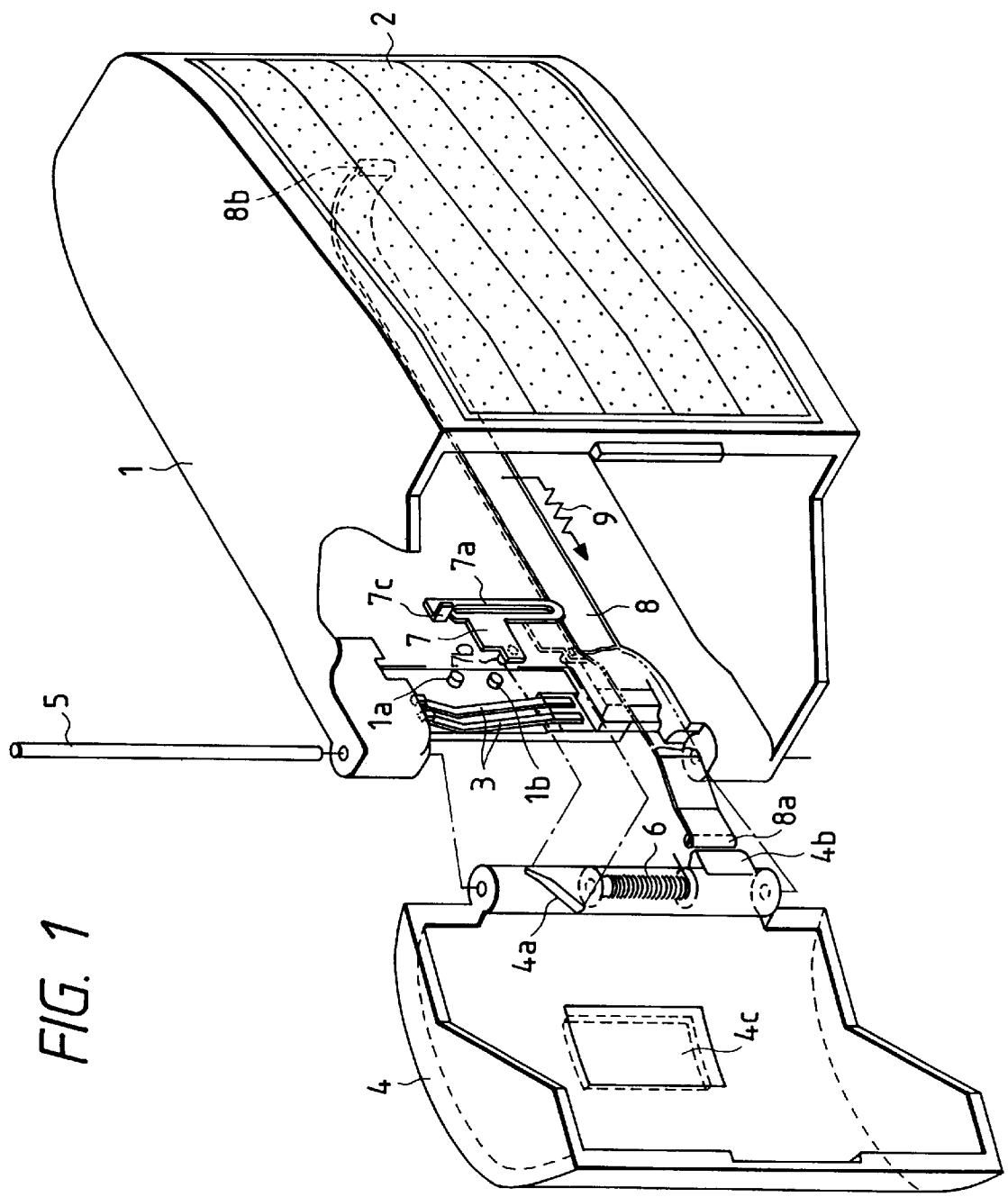
FIG. 1 is an exploded perspective view of an accommodating case with a solar battery, which accommodates an electronic equipment, according to the first embodiment of the present invention.
Figure 2:
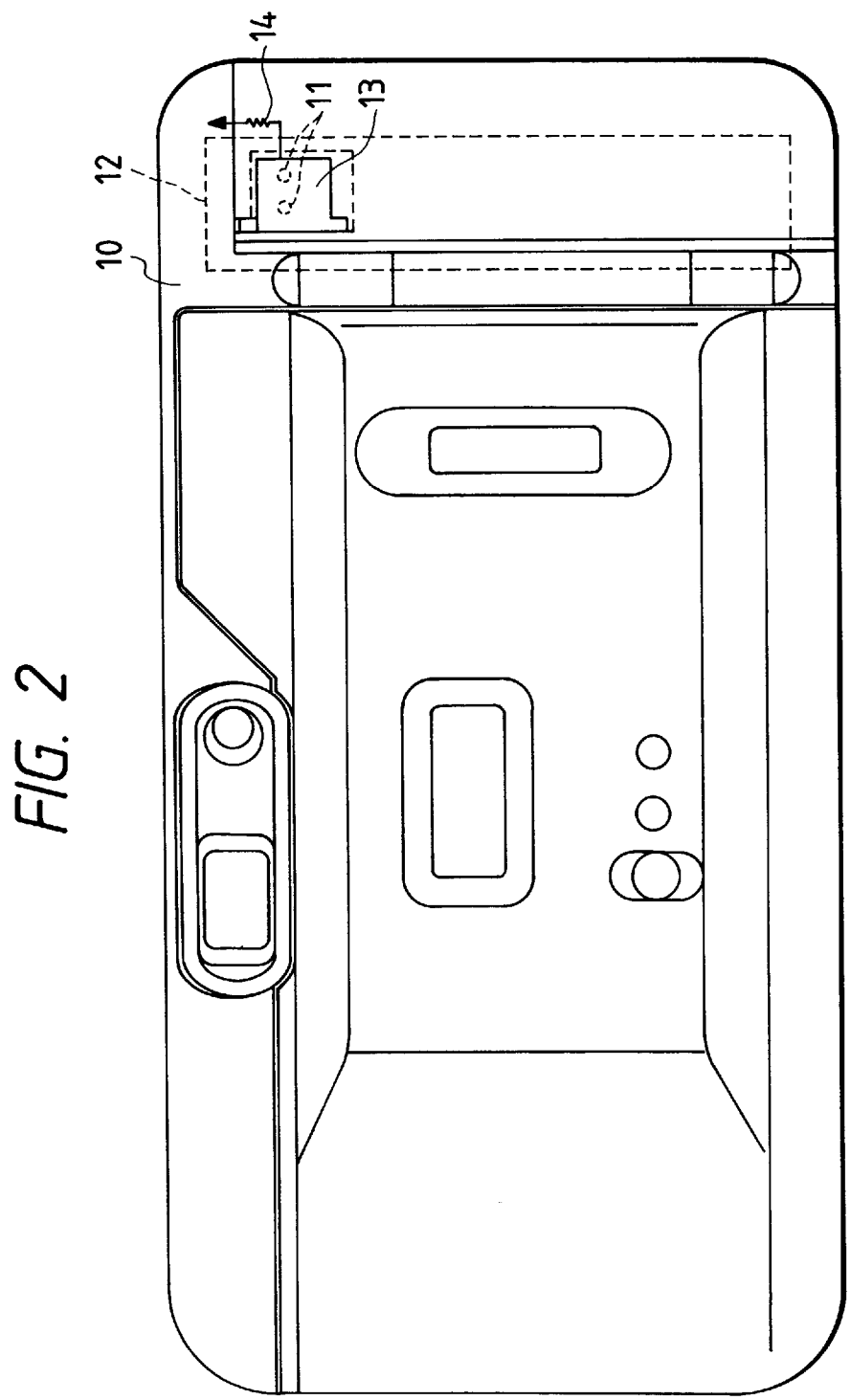
FIG. 2 is a rear view of a camera as the electronic equipment to be accommodated in the accommodating case with the solar battery shown in FIG. 1.

FIG. 1 is an exploded perspective view of an accommodating case with a solar battery, which accommodates an electronic equipment, FIG. 2 is a rear view of a camera as the electronic equipment to be accommodated in the accommodating case with the solar battery shown in FIG. 1, FIG. 3 is a longitudinal sectional view showing a state before a camera-side terminal and an accommodating case-side contact are brought into contact with each other in a state wherein the camera is accommodated in the accommodating case with the solar battery shown in FIG. 1, FIG. 4 is a longitudinal sectional view showing a state wherein the camera-side terminal and the accommodating case-side contact are in contact with each other in a state wherein the camera is accommodated in the accommodating case with the solar battery shown in FIG. 1, and FIG. 5 is a cross-sectional view showing a state before the camera-side terminal and the accommodating case-side contact are brought into contact with each other in a state wherein the camera is accommodated in the accommodating case with the solar battery shown in FIG. 1.

Referring to FIGS. 1 to 5, a solar battery 2 is arranged on the outer surface of an accommodating case 1. Accommodating case-side contacts 3 (including two, i.e., plus and minus contacts) have one-end portions fixed to the accommodating case 1, and are electrically connected to the solar battery 2 via a conduction means (not shown). A case cover 4 is rotatably and axially supported on the accommodating case 1 via a hinge shaft 5. A torsion spring 6 biases the case cover 4 in a direction to close.

A terminal cover plate 7 covers the case-side contacts 3 so as not to be exposed normally, and is vertically movably held since it has an elongated hole 7a which is fitted on shaft portions 1a and 1b provided to the accommodating case 1. A projection 7b is integrally formed on the terminal cover plate 7, and is engaged with a cam groove 4a formed in a hinge portion of the case cover 4. With this structure, the terminal cover plate 7 is vertically moved upon rotation of the case cover 4. A latch member 8 has a distal end portion 8a which contacts a projecting portion 4b formed on the hinge portion of the case cover 4, and a camera contact portion 8b which is formed on the other end of the member 8, which extends to the bottom of the accommodating case 1. A spring 9 biases the latch member 8 to the left in FIG. 1. The distal end portion 8a of the latch member 8 is engaged with the projecting portion 4b formed on the hinge portion of the case cover 4 to latch it against the biasing force of the torsion spring 6 in the opening state of the case cover 4.

A camera main body 10 has camera-side terminals 11 (including two, i.e., plus and minus terminals), which are electrically connected to a secondary battery 12 as a built-in battery via a conduction means (not shown). A terminal cover 13 covers the camera-side terminal 11 so as not be exposed to the outer surface normally. A spring 14 biases the terminal cover 13 upward, i.e., in a direction to cover the camera-side terminals 11. An LCD display 15 (see FIG. 5) is connected to a printed circuit board 16 on which a display circuit portion is arranged.

The LCD display 15 displays the charge amount of the camera main body 10, the number of photographed frames, and data (date, time, and the like) to be in-printed on a film, and also makes a status display indicating whether or not the case-side contacts 3 and the camera-side terminals 11 are connected to each other. Note that a display for informing the connection state between the case-side contacts 3 and the camera-side terminals 11 may be realized by, e.g., an LED display. Such a display may be arranged on the outer portion of the case.

A transparent window 17 is formed on the outer portion of the camera main body 10 at a position where the contents displayed on the LCD display 15 can be seen. Furthermore, the case cover 4 has a transparent window 4c which allows the contents displayed on the LCD display 15 to be seen when the case cover 4 is closed. A hole may be simply formed in place of the transparent window 4c. Also, the position of transparent window 4c is not limited to the case cover 4, but the window 4c may be formed on the upper surface of the accommodating case 1 as long as the LCD display 15 can be seen.

Figure 6:
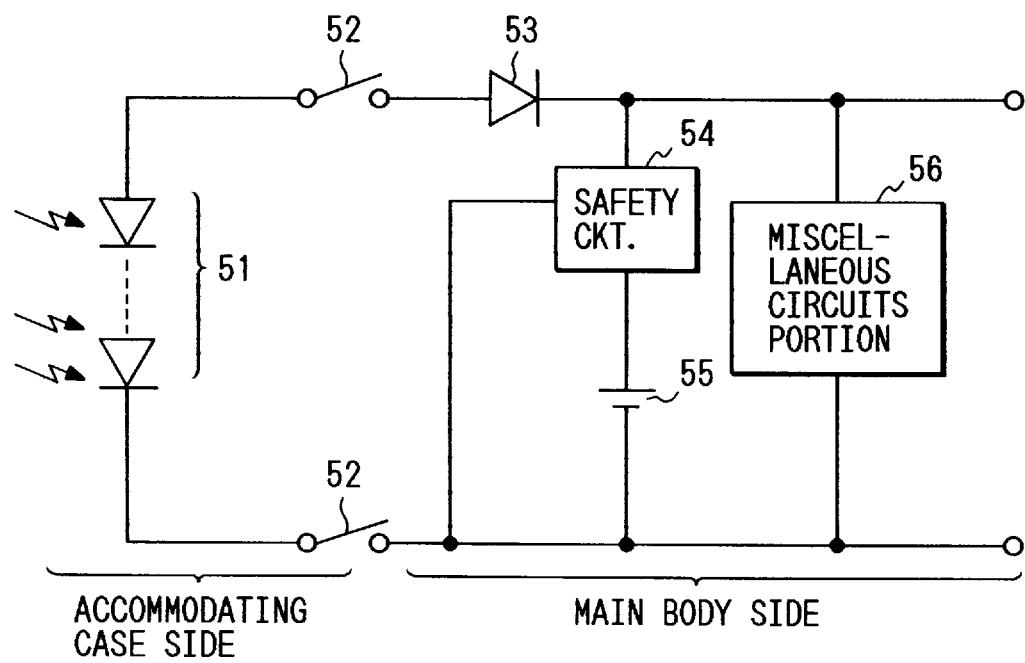
FIG. 6 is a schematic circuit diagram showing the electrical arrangement of the accommodating case with the solar battery and the camera shown in FIGS. 1 and 2.

FIG. 6 is a schematic circuit diagram showing the electrical arrangement of the accommodating case 1 and the camera main body 10.

The arrangement shown in FIG. 6 includes a solar battery 51 (corresponding to the solar battery 2 in FIG. 1 and the like), connection portions 52 corresponding to the case-side contacts 3 and the camera-side terminals 11, a reverse-flow prevention diode 53, a safety circuit 54 for preventing overcharging, a secondary battery 55 (corresponding to the secondary battery 12 shown in FIG. 2 and the like) built in the camera main body 10, and a miscellaneous circuits portion 56 including a drive circuit for the LCD display 15, a circuit for detecting the states of the connection portions 52, and the like.

An energy generated by the solar battery 51 (2) is charged on the secondary battery 55 (12) built in the camera main body 10 when the camera main body 10 is accommodated in the accommodating case 1, and the connection portions 52 (the case-side contacts 3 and the camera-side terminals 11) are electrically connected to each other. The secondary battery 55 (12) is used as a power supply of the electronic equipment.

A terminal connection state upon opening of the case cover 4 and insertion of the camera main body 10 into the accommodating case 1 will be described below with reference to FIGS. 1 to 5 and FIGS. 7 and 8. Note that FIG. 7 is a cross-sectional view showing a state wherein the camera is inserted in the accommodating case with the solar battery shown in FIG. 1, and FIG. 8 is a cross-sectional view showing a state wherein the camera is accommodated in the accommodating case with the solar battery and the case cover is closed from the state shown in FIG. 7.

When the case cover 4 is manually opened in a state wherein the camera main body 10 is not accommodated in the accommodating case 1, and the case cover 4 is closed by the biasing force of the torsion spring 6, the projecting portion 4b formed on the hinge portion of the case cover 4 is brought into contact with the distal end portion 8a of the latch member 8 to move the latch member 8 to the right in FIG. 1 against the biasing force of the spring 9. After the distal end of the projecting portion 4b clears the distal end portion 8a of the latch member 8, the distal end portion 8a moves to the left in FIG. 1 in accordance with the biasing force of the spring 9, and prohibits rotation of the case cover 4 in the closing direction by the biasing force of the torsion spring 6 (see FIG. 7).

In this state, the case cover 4 is opened, and it is ready to insert the camera main body 10 into the accommodating case 1.

Figure 7:
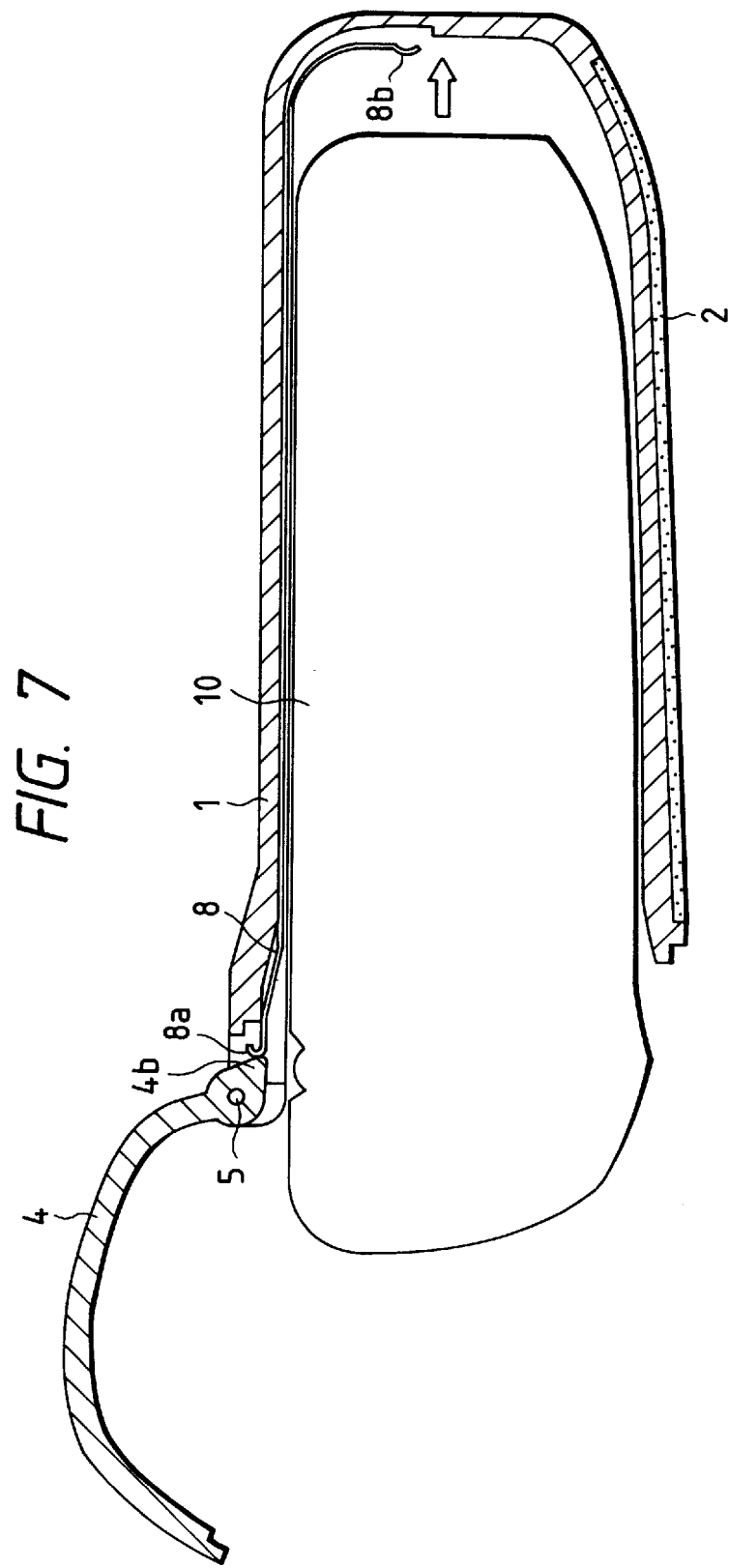
FIG. 7 is a cross-sectional view showing a state wherein the camera is inserted in the accommodating case with the solar battery shown in FIG. 1.

As shown in FIG. 7, when the camera main body 10 is inserted into the accommodating case 1, the right end face of the camera main body 10 is brought into contact with the camera contact portion 8b of the latch member 8. When the camera main body 10 is further pushed into the accommodating case 1, the latch member 8 moves to the right in FIG. 7. Therefore, as shown in FIG. 8, the locking state of the distal end portion 8a of the latch member 8 with respect to the projecting portion 4b is released, and the case cover 4 is closed in accordance with the biasing force of the torsion spring 6.

Upon rotation of the case cover 4 in the closing direction, the projection 7b of the terminal cover plate 7 moves downward along the cam groove 4a of the case cover 4, and the terminal cover plate 7 held inside the accommodating case 1 moves from a state for covering the case-side contacts 3 (FIG. 3) to a state for exposing the case-side contacts 3 (FIG. 4). Furthermore, upon downward movement of the terminal cover plate 7, an upright bent portion 7c of the terminal cover plate 7 pushes the terminal cover 13 of the camera side downward.

In this manner, the camera-side terminals 11 are exposed, and the case-side contacts 3 contact the camera-side terminals 11 by their own biasing force and are electrically connected thereto.

This operation will be described below with reference to FIG. 6. Contact between the case-side contacts 3 and the camera-side terminals 11 means that the connection portions 52 are electrically connected to each other. Thus, the energy generated by the solar battery 51 (2) is charged on the secondary battery 55 (12). This electrical connection state is detected by the circuits portion 56, and a message indicating this is displayed on the LCD display 15 (or is indicated by, e.g., an LED).

A terminal connection state when the case cover 4 is opened in a state wherein the camera main body 10 is accommodated in the accommodating case 1 will be explained below.

When the case cover 4 is opened, the projection 7b of the terminal cover plate 7 moves upward along the cam groove 4a of the case cover 4 upon rotation of the case cover 4, thus covering the case-side contacts 3. At this time, the case-side contacts 3 and the camera-side terminals 11 are electrically disconnected, and the biasing force of the case-side contacts 3 is charged. As the terminal cover plate 7 moves upward, the terminal cover 13 of the camera side moves upward by the biasing force of the spring 14, thus covering the camera-side terminals 11.

Although its description is omitted in the above embodiment, a mechanism for prohibiting the downward movement, i.e., movement, in a direction to expose the camera-side terminal, of the terminal cover 13, which covers the camera-side terminal 11 may be arranged.

FIGS. 9 and 10 show the second embodiment of the present invention. FIG. 9 is a perspective view showing a state wherein a camera as an electronic equipment is accommodated in an accommodating case, and FIG. 10 is a perspective view showing a state before the camera is accommodated in the accommodating case.

Referring to FIGS. 9 and 10, a camera main body 20 has a built-in secondary battery 21. An accommodating case 22 has a case cover 23, which has a solar battery 24 on its outer surface. The case cover 23 is rotatably and axially supported on the accommodating case 22 via a hinge portion 25. A transparent window 26 is held on the upper surface of the accommodating case 22, and is arranged at a position where an LCD display (not shown) arranged on the upper surface of the camera main body 20 can be seen. A heat insulating member 27 is adhered to the inner surfaces of the accommodating case 22 and the case cover 23.

The heat insulating member 27 protects the camera main body 20 from heat and prevents a failure of the camera even when the accommodating case 22 which accommodates the camera is placed under the sunlight to charge the secondary battery 21 from the solar battery 24.

As another heat insulating method, aluminum may be coated on the outer surfaces of the accommodating case 22 and the case cover 23 to increase their surface reflectances, or the outer portions of the accommodating case 22 and the case cover 23 may consist of a metal having a high surface reflectance. With this structure, heat absorption from the sunlight can be minimized, and a heat insulating effect can be obtained.

Furthermore, aluminum may be coated on the outer surface of the camera main body 20, or the outer portion of the camera main body 20 may consist of a metal having a high surface reflectance, thus obtaining a higher heat insulating effect for the internal mechanism in the camera main body.

Note that connection between case-side contacts and camera-side terminals in this embodiment is the same as in the first embodiment, and a detailed description thereof will be omitted since the first embodiment will be quoted therefor.

FIGS. 11 and 12 show the third embodiment of the present invention. FIG. 11 is a perspective view showing a state wherein a camera as an electronic equipment is accommodated in an accommodating case, and FIG. 12 is a perspective view showing a state before the camera is accommodated in the accommodating case.

Referring to FIGS. 11 and 12, a camera main body 30 has a built-in secondary battery 31. An accommodating case 32 vertically movably supports a case cover 33 since guide grooves 33a of the case cover 33 are slidably engaged with rails 32a formed on the two side surfaces of the accommodating case 32. A solar battery 34 is arranged on the outer surface of the case cover 33. A slide plate 35 is vertically movably held on the inner portion of the accommodating case 32, and is biased downward by a spring 36.

In the above arrangement, a projecting portion 35a of the slide plate 35 projects outwardly from a hole 32b of the accommodating case 32. When a closing operation of the case cover 33, i.e., the upward movement of the case cover 33 is performed, the projecting portion 35a is brought into contact with a contact surface 33b of the case cover 33, and pushes the slide plate 35 upward while charging the spring 36. Upon upward movement of the slide plate 35, an upright bent portion 35b of the slide plate 35 moves a cover member which covers terminals (not shown) on the side of the camera main body, thus achieving terminal connection.

Figure 13:
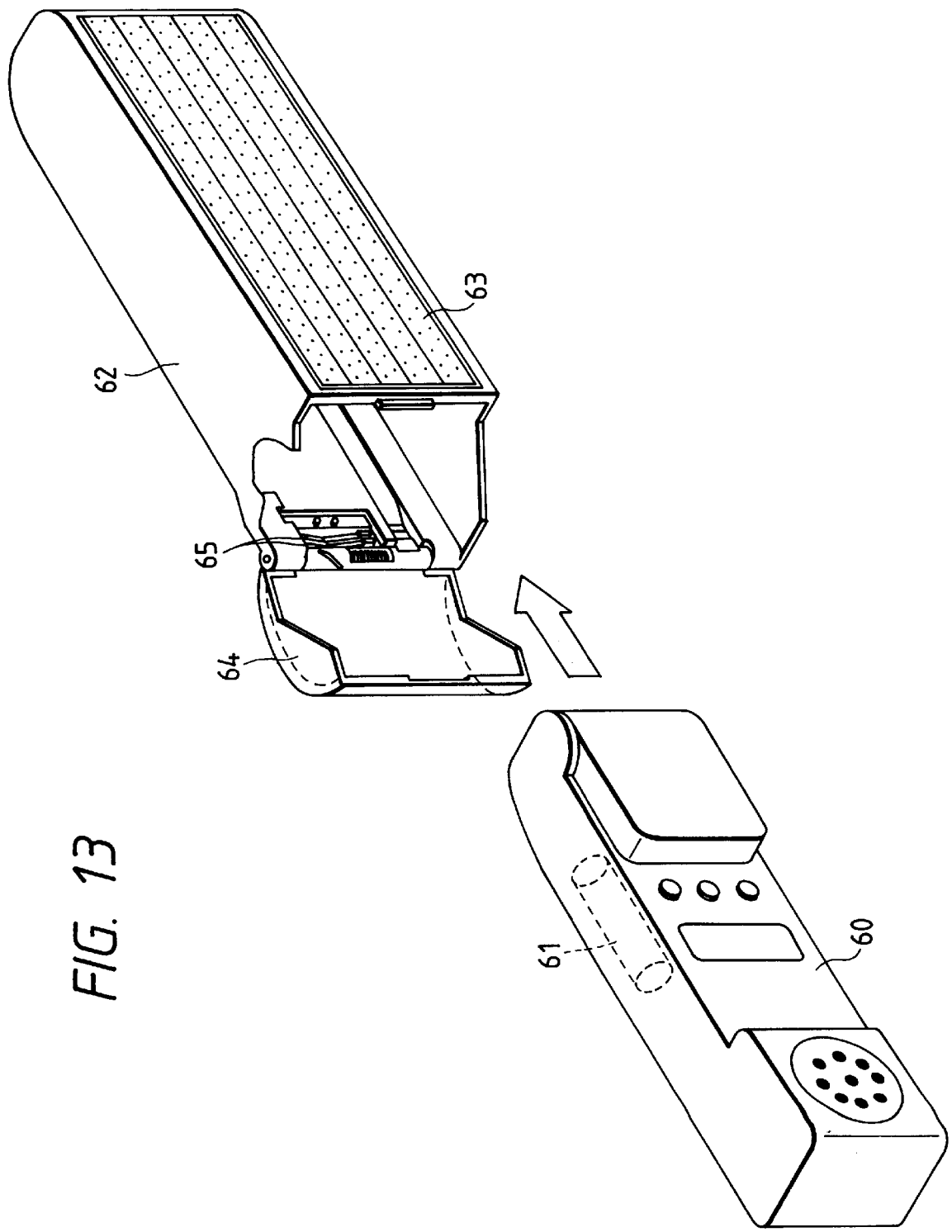
FIG. 13 is a perspective view showing an accommodating case and a cellular phone as an electronic equipment according to the fourth embodiment of the present invention.

FIG. 13 shows the fourth embodiment of the present invention. In this embodiment, a cellular phone is exemplified as an electronic equipment.

Referring to FIG. 13, a cellular phone 60 has a built-in secondary battery 61. A solar battery 63 is arranged on the outer surface of an accommodating case 62. A case cover 64 is rotatably and axially supported on the accommodating case 62 via a hinge shaft. Case-side contacts 65 are connected to the solar battery 63, and are brought into contact with terminals of the cellular phone 60 side, which terminals are connected to the secondary battery 61, by the same arrangement as in the first embodiment when the case cover 64 is closed.

Therefore, when the cellular phone 60 is accommodated in the accommodating case 62 and the case cover 64 is closed, energy generated by the solar battery 63 is charged on the secondary battery 61.

According to each of the above embodiments, since the accommodating case-side terminals and the electronic equipment-side terminals are not normally exposed externally, the terminal contact portions can be prevented from being contaminated to cause a conduction failure.

Since the terminals are covered, a user can be prevented from erroneously short-circuiting the terminals, and cannot connect the terminals to another power supply such as a domestic power supply of 100 V to charge the secondary battery.

The hole or transparent window is formed in the accommodating case, and the display is arranged on the equipment main body to coincide with the hole or window, so that information indicating the condition or connection state of the equipment main body can be confirmed via the accommodating case. The same effect can be expected by arranging the display on the accommodating case.

Furthermore, when the heat insulating member is provided to the inner surfaces of the accommodating case for accommodating the equipment, and the case cover, the equipment main body can be prevented from being heated upon generation of energy by the solar battery under the strong sunlight, thus protecting the equipment from failures. Also, the same effect can be expected by coating aluminum on the surfaces of the accommodating case and the case cover and on the surface of the equipment main body or forming outer portions using a metal having a high reflectance. Furthermore, the heat insulating effect can be further improved by performing the same treatment on the equipment main body.

To summarize, according to each of the above embodiments, terminal connected state setting means, which moves upon a closing operation of a case cover in a state wherein an electronic equipment is accommodated in a case main body, and sets a case-side terminal and an equipment-side terminal in a connected state, is arranged, terminal connected state setting means, which moves upon a closing operation of a case cover in a state wherein an electronic equipment is accommodated in a case main body, exposes a case-side terminal and an equipment-side terminal in a non-exposed state, and sets the terminals in a connected state, is arranged, or terminal connected state setting means, which moves upon an opening operation of a case cover in a state wherein an electronic equipment is accommodated in a case main body, sets a case-side terminal and an equipment-side terminal in a disconnected state, and sets the case-side terminal and the equipment-side terminal in a non-exposed state, is arranged, and the case-side terminal and the equipment-side terminal are set in a connected state or a disconnected state in response to the opening/closing operation of the case cover, and in the disconnected state, the terminals are prevented from being exposed, i.e., are covered.

Therefore, when the electronic equipment is accommodated in the case main body and the case cover is closed, energy generated by the solar battery can be automatically charged on the secondary battery in the electronic equipment. In a state other than a chargeable state, the terminals are prevented from being exposed, thus preventing contamination and a wrong use of the terminals.

Also, latch means, which latches the case cover in an opening state upon an opening operation of the case cover, and releases the latch upon an accommodating operation of the electronic equipment in the case main body, is arranged, and when the case cover is opened, the case cover is automatically latched in the opening state, and when the electronic equipment is accommodated later, the latch is released to allow the closing operation of the case cover.

Therefore, the electronic equipment can be easily accommodated or taken out.

Furthermore, a secondary battery, an equipment-side terminal which is connected to the secondary battery, and is connected to a case-side terminal when the equipment is accommodated in the accommodating case and the case cover is closed, and display means for detecting at least a connected state between the case-side terminal and the equipment-side terminal, and displaying a message indicating this, are arranged, and an observation window through which a display on the display means provided to the electronic equipment is visually observed in a state wherein the electronic equipment is accommodated in the accommodating case, is arranged, and when the case-side terminal and the equipment-side terminal are set in a connected state (electrically connected state), a message indicating this is displayed.

Therefore, a user can recognize at least whether or not energy generated by the solar battery can be charged on the secondary battery in the electronic equipment accommodated in the accommodating case.

Moreover, a heat insulating member for preventing the electronic equipment from being heated is adhered to the inner surfaces of the case cover and the case main body, the surfaces of the case cover and the case main body are subjected to a treatment to obtain a high reflectance, the case cover and the case main body are formed of a material having a high reflectance, the surface of the equipment main body is subjected to a treatment to obtain a high reflectance, or the equipment main body is formed of a material having a high reflectance, and even when the accommodating case is placed under the strong sunlight and is heated, heat can be prevented from being conducted to the electronic equipment.

Therefore, even when the accommodating case which accommodates the electronic equipment is placed under the strong sunlight to cause the solar battery to generate energy, a damage to the electronic equipment can be prevented.

In each of the above embodiments, the present invention can be applied even when the circuit arranged on the case side is a charging circuit other than the solar battery, or the circuit other than a charging circuit, as a matter of course.

The secondary battery of the equipment side to be accommodated in the case may comprise a lithium ion secondary battery, a capacitor, or the like as long as it is a circuit which can be charged, or the present invention can be applied to a circuit other than the circuit which can be charged, as a matter of course. Furthermore, the present invention is not limited to the equipments to be accommodated in the case described in the above embodiments.

The connection state may be displayed using a device other than the LCD in each of the above embodiments, and its display manner is not particularly limited. Furthermore, another indication method such as a sound may be adopted.

According to the present invention, the above embodiments or their technical elements may be combined as needed.

The present invention may be applied to a case wherein all or some of components of the claims or embodiments form a single device, are combined with another device, or constitute a component which constitutes another device.

The individual components shown in schematic or block form in the Drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An apparatus adapted to be accommodated in a case which comprises a case cover for opening and closing the case, comprising:

a terminal for electrically connecting the apparatus with the case;

a terminal cover for covering the terminal; and an interlocking device for opening the terminal cover and allowing for an electrical connection between the apparatus and the case via the terminal when the apparatus is fully accommodated in the case in accordance with a closing operation of the case cover.

2. An apparatus according to claim 1, wherein said interlocking device sets the state for allowing the electrical connection between the apparatus and the case so as to charge the apparatus.

3. An apparatus according to claim 1, wherein said device sets the state for allowing the electrical connection between the apparatus and the case so as to charge the apparatus by a charging unit arranged in the case.

4. An apparatus according to claim 3, wherein said charging unit comprises a solar battery.

5. An apparatus according to claim 4, further comprising a lithium ion battery charged by the solar battery.

6. An apparatus according to claim 3, further comprising a lithium ion battery charged by the charging unit.

7. An apparatus according to claim 1, wherein the apparatus comprises a camera.

8. An apparatus according to claim 1, wherein the apparatus comprises a telephone.

9. An apparatus according to claim 1, wherein the apparatus comprises an electronic equipment.

10. An apparatus according to claim 1, further comprising an indicator which indicates a connection state between the apparatus and the case.

11. An apparatus according to claim 1, further comprising a display device which displays a connection state between the apparatus and the case.

12. An apparatus according to claim 1, further comprising a preventing device which prevents the apparatus from being overheated.

13. An apparatus according to claim 1, further comprising a high reflectance device which causes a surface of the apparatus to have a high reflectance.

14. A apparatus according to claim 1, wherein said interlocking device closes said terminal cover in accordance with an opening operation of the case cover.

15. A case adapted to accommodate an apparatus, comprising:
   a case cover for opening and closing the case;
   a terminal for electrically connecting the case with the apparatus;
   a terminal cover for covering the terminal; and
   an interlocking device for opening the terminal cover and allowing for an electrical connection between the apparatus and the case via the terminal in accordance with a closing operation of the case cover.

16. A case according to claim 15, wherein the apparatus comprises a camera.

17. A case according to claim 15, wherein the apparatus comprises a telephone.

18. A case according to claim 15, wherein the apparatus comprises an electronic apparatus.

19. A case according to claim 15, further comprising an indicator which externally indicates a connection state between the apparatus and the case.

20. A case according to claim 15, further comprising a display device which externally displays a connection state between the apparatus and the case.

21. A case according to claim 15, further comprising a preventing device which prevents the case from being overheated.

22. A case according to claim 15, further comprising a high reflectance device which causes a surface of the case to have a high reflectance.

23. A case according to claim 15, wherein said interlocking device closes said terminal cover in accordance with an opening operation of the case cover.

24. A case according to claim 15, wherein said interlocking device sets a state of allowing the electrical connection in accordance with the closing operation of said cover.

25. A case according to claim 24, wherein said interlocking device sets the state for allowing the electrical connection between the apparatus and the case so as to charge the apparatus.

26. A case according to claim 24, wherein said interlocking device sets the state for allowing an electrical connection between the apparatus and the case so as to charge the apparatus by a charging unit arranged in the case.

27. A case according to claim 26, wherein said charging unit comprises a solar battery.

28. A case according to claim 27, further comprising a lithium ion battery charged by the solar battery.

29. A case according to claim 26, further comprising a lithium ion battery charged by the charging unit.

30. An apparatus adapted to be accommodated in a case which comprises a case cover for opening and closing the case, comprising:
   a terminal for electrically connecting the apparatus with the case;
   a terminal cover for covering the terminal; and
   an interlocking device for closing the terminal cover and preventing an electrical connection between the apparatus and the case via the terminal when the apparatus is fully accommodated in the case in accordance with a opening operation of the case cover.

31. An apparatus according to claim 30, wherein said interlocking device sets the state for preventing the electrical connection between the apparatus and the case so as to restrict charging of the apparatus.

32. An apparatus according to claim 30, wherein said device sets the state for preventing the electrical connection between the apparatus and the case so as to restrict charging of the apparatus by a charging unit arranged in the case.

33. An apparatus according to claim 30, wherein said charging unit comprises a solar battery.

34. An apparatus according to claim 33, further comprising a lithium ion battery charged by the solar battery.

35. An apparatus according to claim 32, further comprising a lithium ion battery charged by the charging unit.

36. An apparatus according to claim 30, wherein the apparatus comprises a camera.

37. An apparatus according to claim 30, wherein the apparatus comprises a telephone.

38. An apparatus according to claim 30, wherein the apparatus comprises an electronic equipment.

39. An apparatus according to claim 30, further comprising an indicator which indicates a connection state between the apparatus and the case.

40. An apparatus according to claim 30, further comprising a display device which displays a connection state between the apparatus and the case.

41. An apparatus according to claim 30, further comprising a preventing device which prevents the apparatus from being overheated.

42. An apparatus according to claim 30, further comprising a high reflectance device which causes a surface of the apparatus to have a high reflectance.

43. An apparatus according to claim 30, wherein said interlocking device opens said terminal cover in accordance with a closing operation of the case cover.

44. A case adapted to accommodate an apparatus, comprising:
   a case cover for opening and closing the case;
   a terminal for electrically connecting the case with the apparatus;

a terminal cover for covering the terminal; and an interlocking device for closing the terminal cover and preventing an electrical connection between the apparatus and the case via the terminal in accordance with an opening operation of the case cover.

45. A case according to claim 44, wherein said interlocking device opens said terminal cover in accordance with a closing operation of the case cover.

46. A case according to claim 44, wherein said interlocking device sets a state of preventing the electrical connection in accordance with the opening operation of said cover.

47. A case according to claim 46, wherein said interlocking device sets the state for preventing the electrical connection between the apparatus and the case so as to restrict charging of the apparatus.

48. A case according to claim 46, wherein said interlocking device sets the state for preventing an electrical connection between the apparatus and the case so as to restrict charging of the apparatus by a charging unit arranged in the case.

49. A case according to claim 48, wherein said charging unit comprises a solar battery.

50. A case according to claim 49, further comprising a lithium ion battery charged by the solar battery.

51. A case according to claim 48, further comprising a lithium ion battery charged by the charging unit.

52. A case according to claim 44, wherein the apparatus comprises a camera.

53. A case according to claim 44, wherein the apparatus comprises a telephone.

54. A case according to claim 44, wherein the apparatus comprises an electronic apparatus.

55. A case according to claim 44, further comprising an indicator which externally indicates a connection state between the apparatus and the case.

56. A case according to claim 44, further comprising a display device which externally displays a connection state between the apparatus and the case.

57. A case according to claim 44, further comprising a preventing device which prevents the case from being overheated.

58. A case according to claim 44, further comprising a high reflectance device which causes a surface of the case to have a high reflectance.

* * * * *

UNITED STATES PATENT AND TRADEMARK OFFICE
CERTIFICATE OF CORRECTION

PATENT NO. : 5,848,904

DATED : December 15, 1998

INVENTOR(S) : Hiroshi Kikuchi

It is certified that error appears in the above-identified patent and that said Letters Patent is hereby corrected as shown below:

<u>Column 10</u>:

Line 35, "claim 30," should read --claim 32,--.

Signed and Sealed this

Twenty-first Day of September, 1999

Attest:

Q. TODD DICKINSON

Attesting Officer

Acting Commissioner of Patents and Trademarks